Patented June 18, 1940

2,204,543

UNITED STATES PATENT OFFICE 2,204,543

PROCESS FOR THE PURIFICATION OF SULPHUR DIOXIDE-CONTAINING TECHNICAL GASES OBTAINED FROM ROASTING

Ernst Berl, Pittsburgh, Pa.

No Drawing. Application September 16, 1936, Serial No. 101,106. In Great Britain September 17, 1935

12 Claims. (Cl. 23—178)

Application for patent has been filed in Great Britain, No. 25,711, dated September 17, 1935.

This invention relates to a process for the purification of sulphur dioxide-containing technical gases obtained from roasting.

In the manufacture of sulphuric acid by a contact or catalytic process the presence of certain impurities in the burner- or furnace-gas, more particularly such impurities as arsenic, zinc and fluorine or their compounds, will, if such impurities are allowed to enter the catalyst chamber, cause a gradual or sometimes a rapid deterioration, or so-called "poisoning" of the catalyst, resulting in the latter becoming less active and less efficient for effecting the oxidation of sulphur dioxide to trioxide. These harmful impurities can exist in either brimstone gas or in the gases from the burning or wasting of sulphuric ores, and the poisoning effect can be produced by the impurities on either platinum or vanadium catalysts. It is usual, however, to find the harmful impurities, or catalyst poisons, in greater proportions in ore gases, and platinum catalysts are usually regarded as more susceptible to poisoning than vanadium catalysts.

Efforts have been made, according to old practice, to remove from old burner- or furnace-gas the catalyst poisons such as arsenic, fluorine etc. and their compounds by washing the gases, for example in a packed tower, with water or dilute sulphuric acid, or with other solutions calculated to absorb or dissolve the impurities and remove them from the gases in solution or in suspension. Such efforts have been to some extent successful, and certain of the gas-washing methods have been efficacious in prolonging the active life of the sulphur dioxide catalyst. However, the gas-washing methods do not remove from the gases every trace of the catalyst poisons. The cleaning of the gas by such methods being incomplete, some proportion of the poison, passing beyond the gas-washing medium, enters the catalyst chamber, producing harmful effects on the catalyst, though at a slower rate. However, in case of any irregularity, such as the inadvertent slackening or cessation of the flow of feed liquid supplied to the gas-washing tower, interference with the equal distribution of said liquid, or a sudden increase in the volume of gas or in the concentration of the catalyst poison in the gas, a considerable quantity of catalyst poison can pass beyond the gas-washing tower within a short time, can thereupon enter the catalyst chamber and destroy the activity of a large amount of expensive catalyst before the irregularity is discovered and corrected.

One object of my invention is to eliminate the liquid-fed washing tower and its hazards, by substituting therefor direct contact of the impure gas mixture with a highly porous solid, in the form of a powder, or granules or lumps, capable of adsorbing or absorbing from the impure gas mixture the entire quantity of harmful impurities therein, competent to cope at all times with any quantity of catalyst poison that can possibly be supplied to it within a unit of time, and not subject to interruption in its action, as by the failure of a pump, the stoppage of a pipe or the negligence of an attendant, thus insuring that the gases will continuously enter the catalyst chamber poison-free, the catalyst thus maintaining its full capacity unchanged even for a period of many years.

Another object of this invention is to avoid the expense for materials such as sulfuric acid or other solvent used heretofore for washing impure gases.

Still another object of this invention is to reduce the expense of moving the gases through the plant, by substituting for the high resistance to gas flow of one or more packed gas-washing towers the low resistance of a gas filter packed with a porous solid of suitably sized particles, and to eliminate the pumping expense incident to supplying gas-washing towers with a continuous feed of liquid.

Other objects are to avoid the introduction of moisture into the gases such as is always involved in the washing of gases with a liquid containing water (such moisture requiring to be later removed from the gases at considerable expense), and to remove from the gases sulfuric acid mist and vapors incapable of being washed out by means of a washing liquid.

The most objectionable of the catalyst poisons is arsenic or a compound of arsenic, such as arsenic hydride and gaseous oxides of arsenic. The poisoning effect of such impurities is more strongly marked in the cases of certain highly activated platinum contact masses, which possess a surface area per unit of volume comparatively smaller than in the case of vanadium masses. However, the latter also suffer deleteriously because double compounds of arsenic oxides and sulphuric acid anhydride precipitate on the contact surface. These glass-like double compounds catalyze the gases to a lesser degree than do the platinum or vanadium compounds. Thus, when such glass-like double compounds precipitate upon the solid substances, the catalyzing effect of the catalyst is considerably reduced.

I have discovered that certain highly porous substances in solid form, containing within their interior structure, as compared with ordinary dense solids, a comparatively large area of surface per unit of volume, have the property, when they are directly contacted by an impure gas mixture, of removing completely from the gas stream the impurities therein, whether these impurities be in gaseous or in liquid form. These highly porous substances therefore act as a gas filter for the removal from a gas mixture the catalyst poisons therein, and in some cases even impurities in finely divided solid form may be removed from gases by such a gas filter. Some examples of such highly porous solids, effective for the purposes here described, are enumerated below.

The substances thus listed I may use singly, without admixture of other similarly highly porous solids; or I may use in the same apparatus a mixture of two or more highly porous solids, each such solid containing a comparatively high ratio of surface area to unit volume. Such highly porous solids are available, according to my invention, for the removal of catalyst poisons from $SO_2$-containing gases of any temperature within the range of $-15°$ C. to $+550°$ C.

The natural location of the equipment containing such highly porous solid is between the $SO_2$-generating furnace or burner and the catalyst chamber.

As a result of further investigation and research and in accordance with the present invention, it has been found that the disadvantage of precipitation of arsenic or arsenic compounds upon the catalyst may be obviated by inserting in front of the true contact substance, materials possessing a large surface, such as silica gel, activated alumina, zeolite or permutite. The poisonous substances in question and in particular arsenic compounds which may be accompanied by other gaseous compounds, such as for example, volatile zinc compounds, sulphur vapor, sulphuric acid vapors and the like are completely held back by filtration over finely powdered or larger pieces of the above mentioned material. The purifying effect may be attained by filtering the cold or hot gases from roasting through granular material which is located in a horizontal, inclined or vertical shaft. In order to decrease the resistance, the poisonous substances may also be removed by introducing the substances of large surface either in the form of sticks or as fine powder into rotating drums which may, if desired or required, be so constructed that the material is introduced in a direction opposite to or the same as that in which the gases are flowing.

The present process accomplishes with absolute safety the removal of poisonous substances from substances from gases obtained in roasting with very little consumption of material and power and with comparatively simple and cheap installations. It could not be anticipated that such a filtration would lead to an effective separation, nor that the poisonous substances in question, such as arsenic or zinc compounds, would react reciprocally with the substances of large surface, such as silica gel, activated alumina, permutite and zeolite.

Applicant has found that particularly good results are obtained with the use of zeolites and permutites (base exchange silicates), especially in the removal of the poisonous arsenic and zinc compounds. He ascribes these results to the observation that these compounds are both mechanically retained and chemically bound by the base exchange silicate, while they are only mechanically retained in silica gel. The base exchange silicates do not have any appreciable catalytic action during applicant's process.

When the purification takes place at ordinary temperatures, silica gel and activated alumina remove the water which is still present in the gases from roasting. Such residual quantities of water, if not removed, may also exert a certain poisonous effect on the contact substances.

The following examples will serve to illustrate the invention, which is not restricted thereby:

*Example 1*

Platinized asbestos, when employed with gas from roasting which was free from arsenic, showed a conversion of 98% of the sulphur dioxide into sulphur trioxide. The use of a gas from roasting containing about 0.02% arsenic hydride during five hours of operation diminished the yield to 74%. Insertion of silica gel in front of the platinized asbestos removed the contact poison, and after several days of operation with a gas containing 0.02% arsenic anhydride, a constant yield of 98% sulphur trioxide was obtained.

*Example 2*

A gas from roasting was employed which contained 0.05% arsenic hydride. The yield of $SO_3$ after four hours was reduced from 97% to 70% when employing silver-vanadium as catalyst. When silica gel was inserted in front of the contact agent, no reduction of the original high yield was observed after several days of operation.

*Example 3*

By inserting sodium permutite or sharp-edged natural zeolite in front of platinized asbestos, the $SO_3$ yield remained constant at more than 98.5% when employing a gas containing 0.05% of arsenic as anhydride. The sulphur trioxide yield fell to 40% after eight hours when no filtering agent was employed.

*Example 4*

The same result as in Examples 2 and 3 were obtained by employing activated alumina instead of silica gel or permutite.

I claim:

1. In the manufacture of sulphuric acid by a contact process, the step of removing catalyst poisons from the roaster or burner gas by passing such gas through a base exchange silicate, said base exchange silicate being substantially catalytically inactive during said step.

2. In the oxidation of sulphur dioxide by means of a catalyst, the step of removing catalyst poisons from the gases containing $SO_2$ as an essential constituent by passing such gases into direct contact with a base exchange silicate, said base exchange silicate being substantially catalytically inactive during said step.

3. A method of removing impurities from an impure gas mixture chiefly containing sulphur dioxide, comprising bringing such gas mixture into direct contact with a catalytically inactive base exchange silicate, said base exchange silicate being substantially catalytically inactive during the application of said method.

4. In the catalytic oxidation of sulphur dioxide, the step of removing from the gases containing $SO_2$ as an essential constituent, prior to the entry of such gases into contact with the catalyst, impurities capable of diminishing the activity of such catalyst, comprising directly contacting such gases, at any temperature within the range of $-15°$ C. to $+550°$ C., with a base exchange silicate, said base exchange silicate being substantially catalytically inactive during said step.

5. In the manufacture of sulphuric acid by a contact process, the step of removing catalyst poisons from the roaster or burner gas by passing such gas through a zeolite, said zeolite being substantially catalytically inactive during said method.

6. In the oxidation of sulphur dioxide by means of a catalyst, the step of removing catalyst poisons from the gases containing $SO_2$ as an essential constituent by passing such gases into direct contact with catalytically inactive zeolites.

7. A method of removing impurities from an impure gas mixture chiefly containing sulphur dioxide, comprising bringing such gas mixture into direct contact with a zeolite, said zeolite being substantially catalytically inactive during said method.

8. In the catalytic oxidation of sulphur dioxide, the step of removing from the gases containing $SO_2$ as an essential constituent, prior to the entry of such gases into contact with the catalyst, impurities capable of diminishing the activity of such catalyst, comprising directly contacting such gases, at any temperature within the range of $15°$ C. to $+550°$ C., with a zeolite, said zeolite being substantially catalytically inactive during said method.

9. In the manufacture of sulphuric acid by a contact process, the step of removing catalyst poisons from the roaster or burner gas by passing such gas through a permutite, said permutite being substantially catalytically inactive during said method.

10. In the oxidation of sulphur dioxide by means of a catalyst, the step of removing catalyst poisons from the gases containing $SO_2$ as an essential constituent by passing such gases into direct contact with a permutite, said permutite being substantially catalytically inactive during said method.

11. A method of removing impurities from an impure gas mixture chiefly containing sulphur dioxide, comprising bringing such gas mixture into direct contact with a permutite, said permutite being substantially catalytically inactive during said method.

12. In the catalytic oxidation of sulphur dioxide, the step of removing from the gases containing $SO_2$ as an essential constituent prior to the entry of such gases into contact with the catalyst, impurities capable of diminishing the activity of such catalyst, comprising directly contacting such gases, at any temperature within the range of $-15°$ C. to $+550°$ C., a permutite, said permutite being substantially catalytically inactive during said method.

ERNST BERL.